(12) United States Patent
Muramatsu et al.

(10) Patent No.: US 12,106,903 B2
(45) Date of Patent: *Oct. 1, 2024

(54) ELECTRONIC COMPONENT

(71) Applicant: Murata Manufacturing Co., Ltd., Nagaokakyo (JP)

(72) Inventors: Satoshi Muramatsu, Nagaokakyo (JP); Masatoshi Yanagihara, Nagaokakyo (JP); Akitaka Doi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 87 days.

This patent is subject to a terminal disclaimer.

(21) Appl. No.: 17/221,857

(22) Filed: Apr. 5, 2021

(65) Prior Publication Data

US 2021/0225590 A1      Jul. 22, 2021

Related U.S. Application Data

(63) Continuation of application No. 16/594,172, filed on Oct. 7, 2019, now Pat. No. 11,081,277.

(30) Foreign Application Priority Data

Oct. 11, 2018  (JP) .................................. 2018-192864
Aug. 6, 2019  (JP) .................................. 2019-144868

(51) Int. Cl.
*H01G 4/008* (2006.01)
*H01G 4/232* (2006.01)
*H01G 4/30* (2006.01)

(52) U.S. Cl.
CPC ............. *H01G 4/008* (2013.01); *H01G 4/232* (2013.01); *H01G 4/30* (2013.01)

(58) Field of Classification Search
CPC .......... H01G 4/008; H01G 4/012; H01G 4/12; H01G 4/224; H01G 4/232; H01G 4/30;
(Continued)

(56) References Cited

U.S. PATENT DOCUMENTS

| 6,621,682 B1* | 9/2003 | Takakuwa | H01G 4/228 361/306.3 |
| 2003/0011962 A1* | 1/2003 | Yamamoto | H01G 4/30 361/321.2 |

(Continued)

FOREIGN PATENT DOCUMENTS

| JP | H09260199 A | 10/1997 |
| JP | H10208978 A | 8/1998 |

(Continued)

OTHER PUBLICATIONS

Muramatsu et al., "Electronic Component", U.S. Appl. No. 16/594,172, filed Oct. 7, 2019.

(Continued)

*Primary Examiner* — Timothy J Thompson
*Assistant Examiner* — Guillermo J Egoavil
(74) *Attorney, Agent, or Firm* — Keating & Bennett, LLP (57) ABSTRACT

An electronic component includes a multilayer body including inner electrodes and dielectric layers alternately stacked, and an outer electrode electrically connected to the inner electrodes. The multilayer body includes first and second main surfaces opposite to each other in a stacking direction, first and second side surfaces opposite to each other in a width direction, and first and second end surfaces opposite to each other in a length direction. The outer electrode includes first outer electrodes disposed on the first and second end surfaces, and at least one second outer electrode disposed on at least one of the first and second side surfaces. The at least one second outer electrode is directly connected (Continued)

to the inner electrodes at positions spaced away from the at least one of the first or second side surface toward the inside of the multilayer body.

19 Claims, 8 Drawing Sheets

(58) Field of Classification Search
CPC ..... H01G 4/2325; B22F 1/0007; B22F 1/107; B22F 1/16; B22F 1/17; B22F 7/002; B22F 1/00; C08L 63/00; C22C 1/0425; C22C 1/0466; H01B 1/22; H05K 1/092; H05K 1/09
USPC .............. 361/305, 301.4, 500; 174/260
See application file for complete search history.

(56) References Cited

U.S. PATENT DOCUMENTS

| | | | | |
|---|---|---|---|---|
| 2008/0130198 A1* | 6/2008 | Nakano | ............... | H01G 4/012 |
| | | | | 361/303 |
| 2010/0254070 A1* | 10/2010 | Lee | ............... | H01G 4/012 |
| | | | | 361/306.3 |
| 2012/0147523 A1* | 6/2012 | Park | ............... | H01C 7/008 |
| | | | | 977/932 |
| 2013/0106560 A1* | 5/2013 | Zenzai | ............... | H01F 27/292 |
| | | | | 361/321.1 |
| 2014/0368968 A1* | 12/2014 | Lee | ............... | H01G 4/30 |
| | | | | 361/301.4 |
| 2017/0018363 A1* | 1/2017 | Tanaka | ............... | H01G 4/30 |
| 2017/0148571 A1* | 5/2017 | Akada | ............... | H01G 4/232 |
| 2017/0243697 A1* | 8/2017 | Mizuno | ............... | H01G 4/1227 |
| 2020/0027661 A1* | 1/2020 | Park | ............... | H01G 4/12 |

FOREIGN PATENT DOCUMENTS

| | | | | | |
|---|---|---|---|---|---|
| JP | 2001044068 | A | | 2/2001 | |
| JP | 2002170736 | A | * | 6/2002 | |
| JP | 2006032747 | A | * | 2/2006 | ............. H01G 4/30 |
| JP | 2007019101 | A | | 1/2007 | |
| JP | 2014146754 | A | * | 8/2014 | ............. H01G 4/35 |
| JP | 2015023287 | A | | 2/2015 | |
| JP | 2017028013 | A | | 2/2017 | |
| JP | 2017-126629 | A | | 7/2017 | |
| KR | 20070044109 | A | * | 4/2007 | ............. H01G 4/10 |
| WO | WO-2008047566 | A1 | * | 4/2008 | ............. H01G 4/012 |

OTHER PUBLICATIONS

Official Communication issued in corresponding Korean Patent Application No. 10-2019-0112063, mailed on Nov. 19, 2021.
Office Action in JP2019144868, mailed Jun. 6, 2023, 3 pages.
Office Action in JP2019-144868, mailed Nov. 14, 2023, 4 pages.

* cited by examiner

ELECTRONIC COMPONENT

CROSS REFERENCE TO RELATED APPLICATIONS

This application claims the benefit of priority to Japanese Patent Application No. 2018-192864 filed on Oct. 11, 2018 and Japanese Patent Application No. 2019-144868 filed on Aug. 6, 2019. The entire contents of this application are hereby incorporated herein by reference.

BACKGROUND OF THE INVENTION

1. Field of the Invention

The present invention relates to an electronic component.

2. Description of the Related Art

A known electronic component includes a multilayer body in which inner electrodes and dielectric layers are alternately stacked, and an outer electrode that is electrically connected to the inner electrodes and that is formed on a surface of the multilayer body.

Such an electronic component disclosed in Japanese Unexamined Patent Application Publication No. 2016-86118 is a multilayer ceramic capacitor including outer electrodes that are disposed on both of end surfaces of a multilayer body and outer terminals that are disposed on both of side surfaces thereof. In the multilayer ceramic capacitor, signal inner electrodes that are extended to the end surfaces of the multilayer body and ground inner electrodes that are extended to the side surfaces of the multilayer body are alternately stacked with dielectric layers interposed therebetween. The outer electrodes that are disposed on the end surfaces of the multilayer body are electrically connected to the signal inner electrodes. Ground outer terminals that are disposed on the side surfaces of the multilayer body are electrically connected to the ground inner electrodes.

However, the multilayer ceramic capacitor disclosed in Japanese Unexamined Patent Application Publication No. 2016-86118 has a problem in that the size of an effective region in which each signal inner electrode and the corresponding ground inner electrode overlap in a stacking direction decreases because portions of the ground inner electrode are extended to the side surfaces of the multilayer body, and an electrostatic capacitance decreases accordingly.

SUMMARY OF THE INVENTION

Preferred embodiments of the present invention provide electronic components that each include outer electrodes on side surfaces of a multilayer body and that reduces or prevents the size of an effective region in which inner electrodes overlap in the stacking direction from decreasing.

According to a preferred embodiment of the present invention, an electronic component includes a multilayer body in which inner electrodes and dielectric layers are alternately stacked, and an outer electrode that is electrically connected to the inner electrodes. The multilayer body includes a first main surface and a second main surface that are opposite each other in a stacking direction, a first side surface and a second side surface that are opposite each other in a width direction perpendicular or substantially perpendicular to the stacking direction, and a first end surface and a second end surface that are opposite each other in a length direction perpendicular or substantially perpendicular to the stacking direction and the width direction. The outer electrode includes first outer electrodes that are disposed on the first end surface and the second end surface, and at least one second outer electrode that is disposed on at least one of the first side surface or the second side surface. The at least one second outer electrode is directly connected to the inner electrodes at positions spaced away from the at least one of the first side surface or the second side surface toward an inside of the multilayer body.

The multilayer body may include a margin portion in which the inner electrodes are not provided when a section of the multilayer body having the length direction and the width direction is viewed in the stacking direction. The at least one second outer electrode may include a through section that extends through the margin portion and is directly connected to the inner electrodes using the through section.

A dimension of the margin portion in the width direction may be no less than about 5 µm and no more than about 30 µm.

A shortest distance L1 between the first end surface and the second end surface in the length direction and a dimension L2 of the through section in the length direction may satisfy a relationship of $L2/L1 \geq 0.42$.

The shortest distance L1 and the dimension L2 may satisfy a relationship of $L2/L1 \geq 0.52$.

The inner electrodes may include a first inner electrode that is electrically connected to a corresponding one of the first outer electrodes and a second inner electrode that is electrically connected to the at least one second outer electrode. The second inner electrode may be structured so as not to be in contact with the first end surface and the second end surface of the multilayer body. The first inner electrode may include a notch that overlaps, in the stacking direction, a connection between the second inner electrode and the at least one second outer electrode.

The margin portion may include margin layers that are stacked in the width direction.

The second inner electrode may contain Si and Ti. A mole ratio of Si to Ti contained in an end portion of the second inner electrode in the width direction may be larger than that in a central portion of the second inner electrode in the width direction.

The outer electrode may be formed by being simultaneously fired together with the inner electrodes.

An average particle diameter of a dielectric particle that is contained in the dielectric layers that are interposed between the inner electrodes may be larger than an average particle diameter of a dielectric particle that is contained in the margin portion.

A dimension, in the width direction, of one of the inner electrodes that is located at a central portion in the stacking direction may be larger than a dimension, in the width direction, of another inner electrode that is located at an outer portion in the stacking direction.

According to preferred embodiments of the present invention, the outer electrode includes the first outer electrodes that are disposed on the first end surface and the second end surface, and the at least one second outer electrode that is disposed on the at least one of the first side surface or the second side surface. The at least one second outer electrode is directly connected to the inner electrodes at positions spaced away from the at least one of the first side surface or the second side surface toward an inside of the multilayer body. That is, it is not necessary for the inner electrodes to include extended portions that protrude in the width direction for connection to the at least one second outer electrode.

Accordingly, an effective region in which the inner electrodes overlap in the stacking direction can be enlarged, and characteristics of the electronic component can be improved.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail below with reference to the drawings. In the following description, examples of electronic components according to preferred embodiments of the present invention are multilayer ceramic capacitors. The electronic components, however, are not limited to the multilayer ceramic capacitor and may be other electronic components, such as an inductor or a LC filter, for example.

Figure 1:
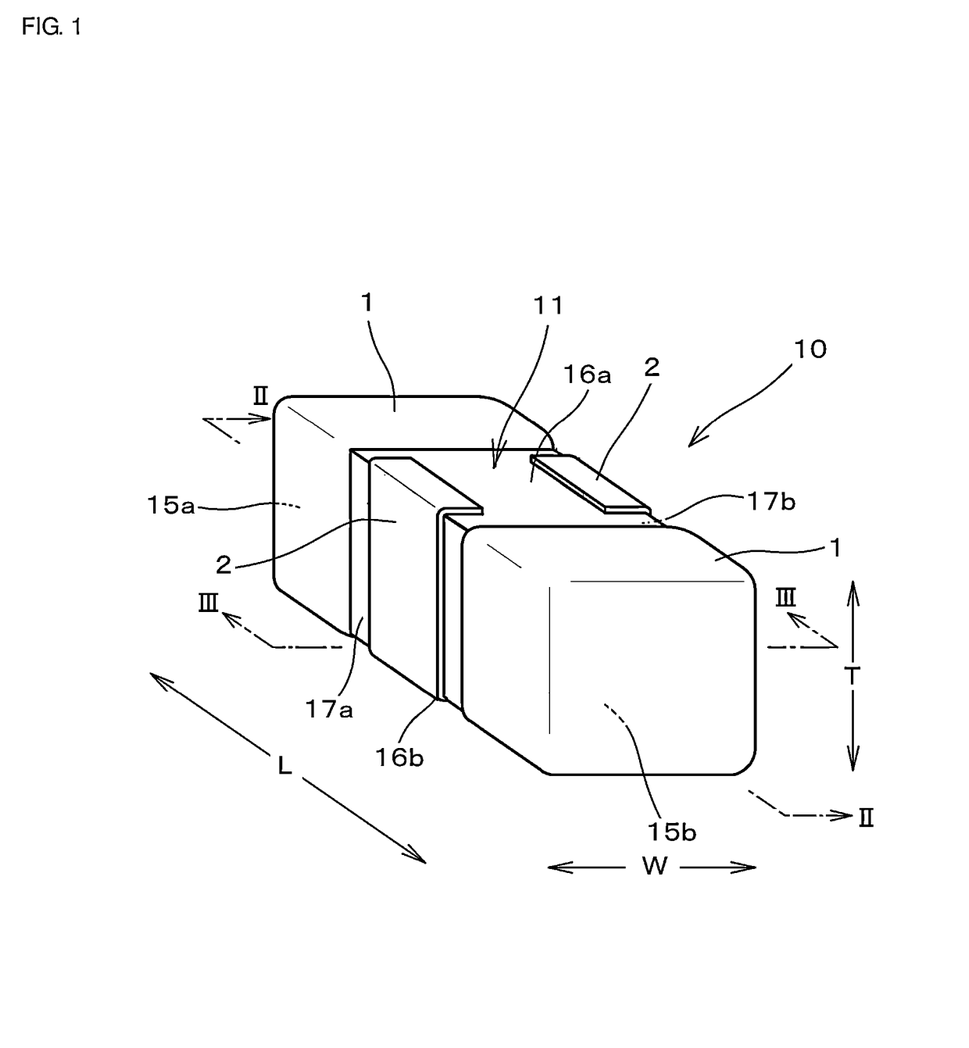
FIG. 1 is a perspective view of an example of a multilayer ceramic capacitor according to a preferred embodiment of the present invention.
Figure 2:
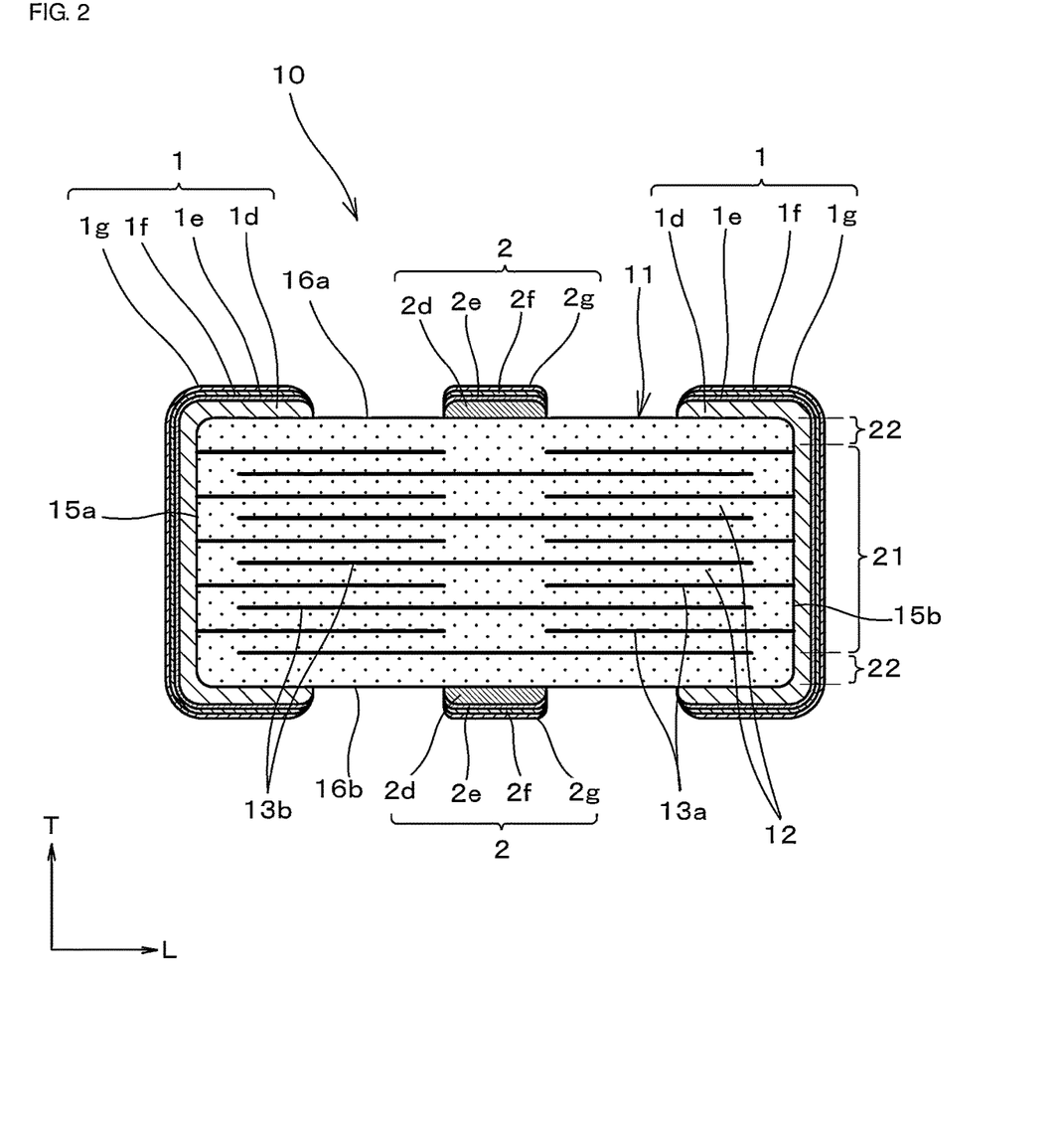
FIG. 2 is a sectional view of the multilayer ceramic capacitor illustrated in FIG. 1 taken along line II-II.
Figure 3:
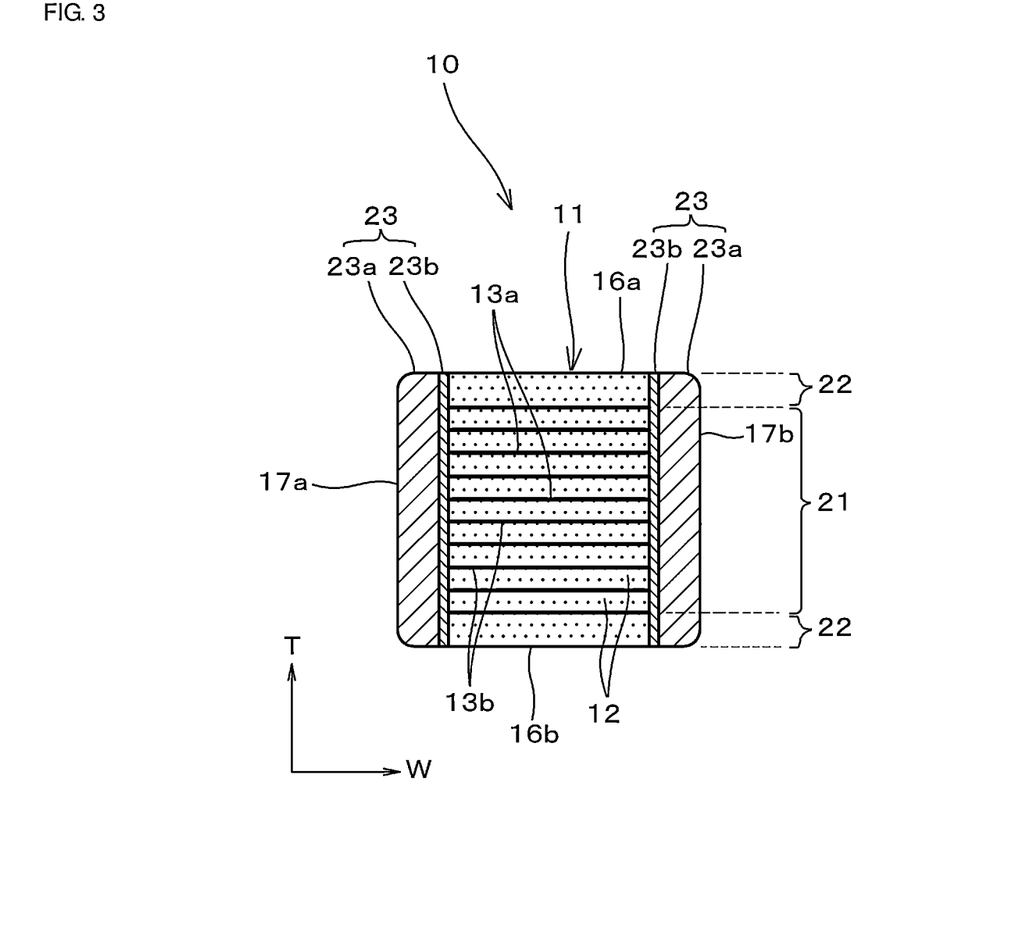
FIG. 3 is a sectional view of the multilayer ceramic capacitor illustrated in FIG. 1 taken along line III-III.

FIG. 1 is a perspective view of an example of a multilayer ceramic capacitor 10 according to a preferred embodiment of the present invention. FIG. 2 is a sectional view of the multilayer ceramic capacitor 10 illustrated in FIG. 1 taken along line II-II. FIG. 3 is a sectional view of the multilayer ceramic capacitor 10 illustrated in FIG. 1 taken along line III-III.

As illustrated in FIG. 1 to FIG. 3, the multilayer ceramic capacitor 10 preferably has a rectangular or substantially rectangular cuboid shape overall and includes a multilayer body 11 and outer electrodes 1 and 2 that are disposed on surfaces of the multilayer body 11.

The multilayer body 11 includes a first end surface 15a and a second end surface 15b that are opposite each other in a length direction L, a first main surface 16a and a second main surface 16b that are opposite each other in a stacking direction T, and a first side surface 17a and a second side surface 17b that are opposite each other in a width direction W.

The first end surface 15a and the second end surface 15b extend in the width direction W and the stacking direction T. The first main surface 16a and the second main surface 16b extend in the length direction L and the width direction W. The first side surface 17a and the second side surface 17b extend in the length direction L and the stacking direction T.

The outer electrodes 1 and 2 include first outer electrodes 1 and second outer electrodes 2. According to the present preferred embodiment, as illustrated in FIG. 1, two of the first outer electrodes 1 are disposed on the first end surface 15a and the second end surface 15b that are opposite to each other, and two of the second outer electrodes 2 are disposed on the first side surface 17a and the second side surface 17b that are opposite to each other.

Here, a direction in which the two first outer electrodes 1 are opposite to each other is defined as the length direction L of the multilayer ceramic capacitor 10, and a direction in which first inner electrodes 13a and second inner electrodes 13b, which are inner electrodes 13 described later, are stacked is defined as the stacking direction T, and a direction perpendicular or substantially perpendicular to the length direction L and the stacking direction T is defined as the width direction W.

Regarding the size of the multilayer ceramic capacitor 10, for example, a dimension in the length direction L is preferably no less than about 0.2 mm and no more than about 3.2 mm, a dimension in the width direction W is preferably no less than about 0.1 mm and no more than about 1.6 mm, and a dimension in the stacking direction T is preferably no less than about 0.1 mm and no more than about 1.6 mm. The dimensions may have a tolerance of about +10%, for example. The relationship of magnitude among the dimension in the width direction W, the dimension in the length direction L, and the dimension in the stacking direction T of the multilayer ceramic capacitor 10 does not depend on the relationship of magnitude of the dimensions according to the present preferred embodiment. For example, the dimension in the width direction W may be larger than the dimension in the length direction L.

The multilayer body 11 includes rounded corner portions and rounded ridge portions. Three surfaces of the multilayer body 11 intersect each other at the corner portions. Two surfaces of the multilayer body 11 intersect each other along the ridge portions.

As illustrated in FIG. 2 and FIG. 3, the multilayer body 11 includes an inner layer portion 21, outer layer portions 22, and margin portions 23.

The inner layer portion 21 includes dielectric layers 12, the first inner electrodes 13a, and the second inner electrodes 13b. The dielectric layers 12, the first inner electrodes 13a, and the second inner electrodes 13b extend in the width direction W and the length direction L.

The dielectric layers 12 are interposed between the first inner electrodes 13a and the second inner electrodes 13b. The first inner electrodes 13a and the second inner electrodes 13b are alternately stacked with the dielectric layers 12 interposed therebetween, and consequently, the inner layer portion 21 is provided.

Each dielectric layer 12 preferably includes dielectric ceramic particles each of which, for example, has a perovskite structure and contains a perovskite compound containing Ba and Ti as a main component. The main component may contain an additive of at least one of Si, Mg, Mn, or Ba, for example. The dielectric layer 12 may contain a rare-earth element such as Dy, Y, or Ho, for example. The thickness of the dielectric layer 12 is preferably, for example, no less than about 0.3 μm and no more than about 1.0 μm.

The first inner electrodes 13a and the second inner electrodes 13b face each other in the stacking direction T with the dielectric layers 12 interposed therebetween. An electrostatic capacitance is generated in regions in which the first inner electrodes 13a and the second inner electrodes 13b face each other with the dielectric layers 12 interposed therebetween.

Figure 4A:
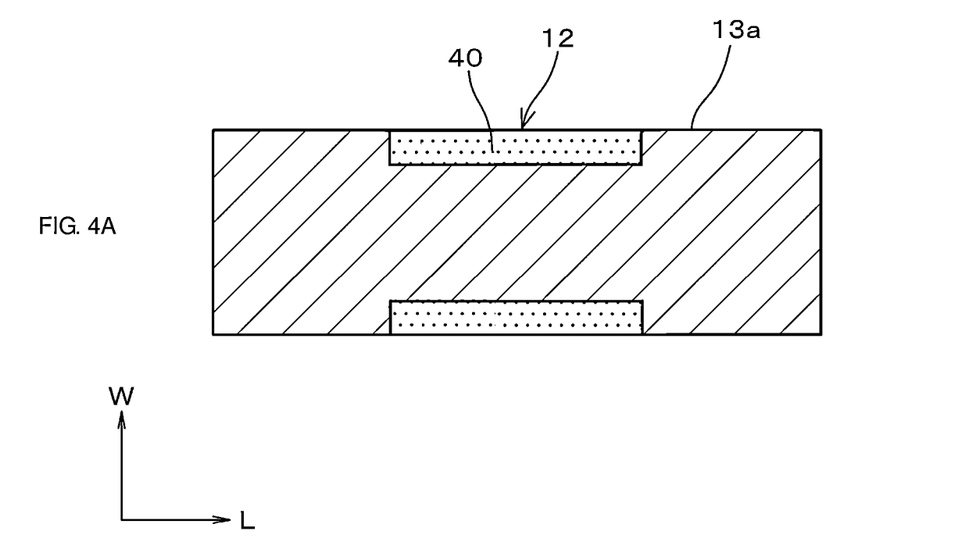
FIG. 4A is a plan view of a first inner electrode and a dielectric layer.
Figure 4B:
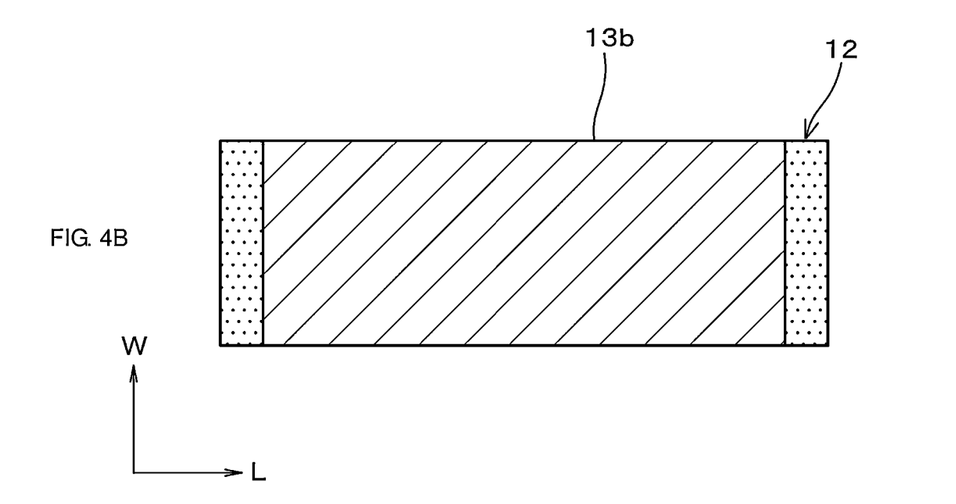
FIG. 4B is a plan view of a second inner electrode and a dielectric layer.

FIG. 4A is a plan view of one of the dielectric layers 12 on which the corresponding first inner electrode 13a is provided. FIG. 4B is a plan view of one of the dielectric layers 12 on which the corresponding second inner electrode 13b is provided.

As illustrated in FIG. 4A, each first inner electrode 13a includes notches 40 on central portions in the length direction L and along both of edges in the width direction W. That is, the first inner electrode 13a has a size smaller than that of each dielectric layer 12 due to the notches 40.

The first inner electrodes 13a extend in the length direction L to the first end surface 15a and the second end surface 15b of the multilayer body 11. The first inner electrodes 13a extend in the width direction W so as to be in contact with the margin portions 23 described later except for the notches 40.

The second inner electrodes 13b are structured so as not to be in contact with the first end surface 15a and the second end surface 15b on which the first outer electrodes 1 are disposed. That is, as illustrated in FIG. 4B, the second inner electrodes 13b extend in the width direction W so as to be in contact with the margin portions 23 described later but do not extend in the length direction L to the first end surface 15a and the second end surface 15b of the multilayer body 11. Accordingly, when the size of each dielectric layer 12 is considered as a standard, end portions of the second inner electrodes 13b in the length direction L are located a predetermined distance inward away from the first end surface 15a and the second end surface 15b in the length direction L.

The second inner electrodes 13b are connected to the second outer electrodes 2 that are disposed on the first side surface 17a and the second side surface 17b of the multilayer body 11 as described later but include no extended portions that protrude in the width direction W for connection to the second outer electrodes 2 as illustrated in FIG. 4B. As illustrated in FIGS. 4A and 4B, the maximum dimension of each second inner electrode 13b in the width direction W is preferably equal or substantially equal to the maximum dimension of each first inner electrode 13a in the width direction W.

The first inner electrodes 13a and the second inner electrodes 13b preferably contain, for example, Ni. The first inner electrodes 13a and the second inner electrodes 13b may contain, for example, a metal such as Cu, Ag, Pd, an Ag—Pd alloy, or Au other than Ni. The first inner electrodes 13a and the second inner electrodes 13b preferably contain a common material that is the same material as dielectric ceramics that are contained in the dielectric layers 12.

The first inner electrodes 13a and the second inner electrodes 13b preferably contain, for example, Si and Ti. The mole ratio of Si to Ti contained in end portions, in the width direction W, of the second inner electrodes 13b that have a uniform dimension in the width direction W is preferably larger than that in central portions of the second inner electrodes 13b in the width direction W. That is, Si is segregated in the end portions of the second inner electrodes 13b in the width direction W. Similarly, Si is segregated in end portions of the first inner electrodes 13a in the width direction W.

The amount of Ti and Si that is contained in the second inner electrodes 13b can be obtained, for example, by using a wave-length-dispersive X-ray spectroscopy (WDX) after the multilayer ceramic capacitor 10 is polished to expose the second inner electrodes 13b.

The number of the inner electrodes 13 that are stacked and that include the first inner electrodes 13a and the second inner electrodes 13b is preferably, for example, no less than 20 and no more than 500. The thickness of each of the first inner electrodes 13a and the second inner electrodes 13b is preferably, for example, no less than about 0.1 μm and no more than about 0.8 μm.

According to the present preferred embodiment, as illustrated in FIG. 3, the end portions of the inner electrodes 13 are aligned in the stacking direction when a section of the multilayer ceramic capacitor 10 having the width direction W and the stacking direction T is viewed in the length direction L. That is, the dimensions of the inner electrodes 13 in the width direction W are preferably equal or substantially equal to each other.

Figure 5:
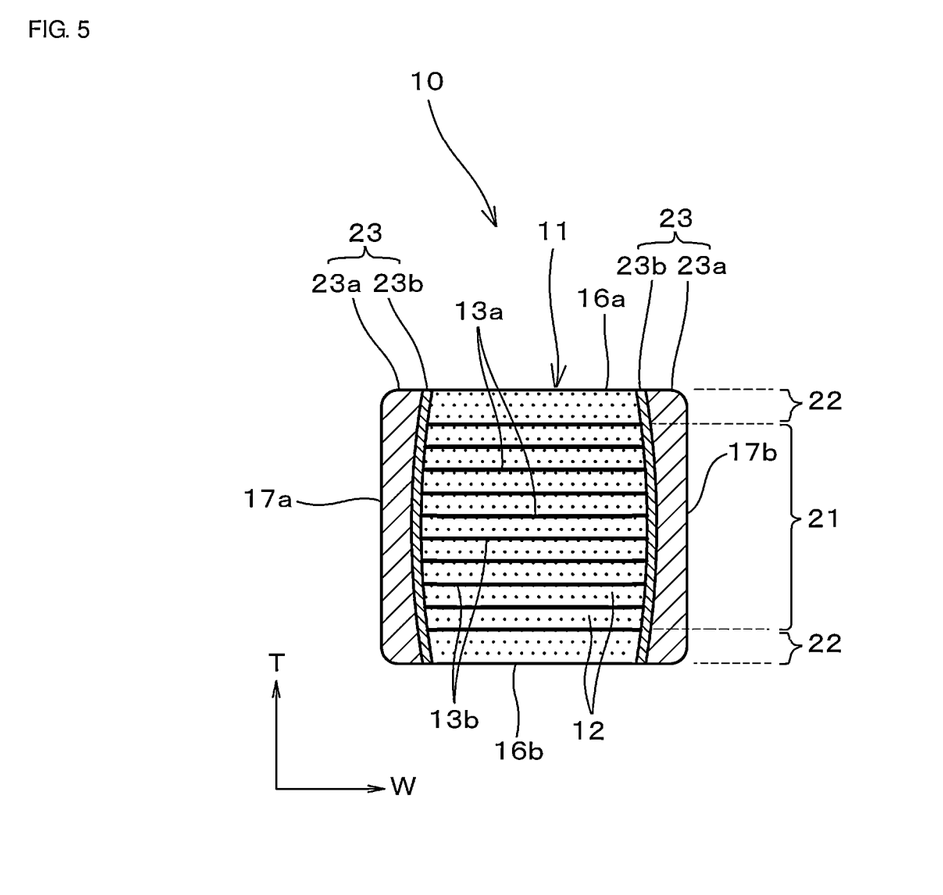
FIG. 5 is a sectional view of the multilayer ceramic capacitor in which end portions, in the width direction, of an inner electrode that is located at a central portion in a stacking direction protrude outward more than end portions of other inner electrodes at outer portions in the stacking direction.

As illustrated in FIG. 5, a positional relationship may be such that the end portions of the inner electrode 13 in the width direction W at a central portion in the stacking direction T protrude outward more than the end portions at outer portions in the stacking direction T. In other words, the dimensions, in the width direction W, of the inner electrodes 13 that are located at the outer portions in the stacking direction T are smaller than the dimension, in the width direction W, of the inner electrode 13 that is located at the central portion in the stacking direction T. A decrease in the dimensions, in the width direction W, of the inner electrodes 13 that are located at the outer portions in the stacking direction T enables distances from the ridge portions to the inner electrodes to be increased, and humidity resistance against water that enters from the ridge portions can be improved.

For example, the dimensions of the inner electrodes 13 in the width direction W can be measured by the following method. A surface of the multilayer ceramic capacitor 10 having the width direction W and the stacking direction T is first exposed. In the following description, the surface having the width direction W and the stacking direction T is referred to as a WT section. Subsequently, the WT section is imaged with an optical microscope. The dimension, in the width direction W, of the inner electrode 13 that is located at the central portion in the stacking direction T and the dimensions, in the width direction W, of the inner electrodes 13 that are located at the outer portions in the stacking direction T are measured. The dimension, in the width direction W, of the inner electrode 13 that is located at the central portion in the stacking direction T and the dimensions, in the width direction W, of the inner electrodes 13 that are located at the outer portions in the stacking direction T are measured by calculating average values of measured values at three positions of the position of a central portion of the multilayer ceramic capacitor 10 in the length direction L, a position nearer than the central portion to the first end surface 15a, and a position nearer than the central portion to the second end surface 15b.

The outer layer portions 22 are disposed on both of the outsides of the inner layer portion 21 in the stacking direction T. That is, the inner layer portion 21 is interposed between the two outer layer portions 22 that are disposed on both of the outsides in the stacking direction T. In the outer layer portions 22, the first inner electrodes 13a and the second inner electrodes 13b are not provided except for the margin portions 23 described later when a section of the multilayer body 11 having the stacking direction T and the width direction W is viewed in the length direction L.

Each outer layer portion 22 includes a dielectric body made of, for example, the same material as that of the dielectric layers 12. A different dielectric material is also acceptable. The dimension of the outer layer portion 22 in the stacking direction T is preferably, for example, about 10 µm or more.

In the margin portions 23, the first inner electrodes 13a, and the second inner electrodes 13b are not provided when a section of the multilayer body 11 having the length direction L and the width direction W is viewed in the stacking direction T. As illustrated in FIG. 3, the margin portions 23 are located on both of the outsides in the width direction W. That is, the two margin portions 23 are disposed so as to interpose the inner layer portion 21 and the outer layer portions 22 therebetween from both of the outsides in the width direction W. According to the present preferred embodiment, the margin portions 23 are located on both of the outsides in the width direction W but may be disposed on both of the outsides in the length direction L, that is, near the first end surface 15a and the second end surface 15b.

According to the present preferred embodiment, each margin portion 23 includes margin layers that are stacked in the width direction W. Specifically, the margin portion 23 includes an outer margin layer 23a and an inner margin layer 23b. The outer margin layer 23a is located near the first side surface 17a or the second side surface 17b of the multilayer body 11. The inner margin layer 23b is located near the inner layer portion 21, that is, at a position nearer than the outer margin layer 23a to the inside in the width direction W.

When each margin portion 23 includes the margin layers 23a and 23b, boundaries therebetween can be readily checked by observing difference in sinterability between the outer margin layer 23a and the inner margin layer 23b with an optical microscope. That is, there is a boundary line between the outer margin layer 23a and the inner margin layer 23b.

The dimension of each margin portion 23 in the width direction W is preferably, for example, no less than about 5 µm and no more than about 100 µm. According to the present preferred embodiment, the dimension of the outer margin layer 23a in the width direction W is preferably larger than the dimension of the inner margin layer 23b in the width direction W.

The dimension of each margin portion 23 in the width direction W means an average dimension that is calculated on the basis of measured values of the dimension of the margin portion 23 at positions in the stacking direction T. A method of measuring the dimension of the margin portion 23 in the width direction W is as follows.

A WT section of the multilayer ceramic capacitor 10 having the width direction W and the stacking direction T is first exposed. Subsequently, an optical microscope is used for imaging with the end portions of the first inner electrodes 13a and the second inner electrodes 13b in the width direction W in the WT section are within the same field of view as a corresponding one of the two margin portions 23 that are located on both of the outsides in the width direction W. Three portions including an upper portion, a central portion, and a lower portion in the stacking direction T are imaged. Parallel lines in the width direction W are drawn on the upper portion, the central portion, and the lower portion from the end portions of the first inner electrodes 13a and the second inner electrodes 13b in the width direction W toward the first side surface 17a or the second side surface 17b, and the lengths of the lines are measured. The average values of the measured lengths of the lines are calculated for the upper portion, the central portion, and the lower portion. The average values are averaged to obtain the dimension of the margin portion 23 in the width direction W.

Each margin portion 23 includes a dielectric body preferably made of, for example, a dielectric ceramic material that contains $BaTiO_3$ as a main component and that has a perovskite structure. The main component preferably contains, for example, an additive of Si.

The average particle diameter of the dielectric particles that are contained in the dielectric layers 12 that are interposed between the first inner electrodes 13a and the second inner electrodes 13b is larger than the average particle diameter of the dielectric particles that are contained in the margin portions 23. The average particle diameter of the dielectric particles in a central portion of the multilayer body 11 in the width direction W and the stacking direction T is compared with the average particle diameter of the dielectric particles in central portions of the margin portions 23 in the width direction W and the stacking direction T after the multilayer body 11 is polished up to a central portion in the length direction L. The average particle diameter of the dielectric particles is calculated in a manner in which the exposed section is imaged with the settings of the SEM including a magnification of 5000, an acceleration voltage of about 15 kV, and a field of view of about 30 µm× about 30 µm, the circumferences of all of the dielectric particles are recognized by using image-processing software to calculate an area, and the area is regarded as the area of a circle. The diameters of all of the dielectric particles that are within the range of the image except for a dielectric particle that is partially imaged are measured. The average value thereof is determined to be the average particle diameter of the dielectric particles.

The outer margin layer 23a preferably contains Si in an amount larger than that in the inner margin layer 23b. That is, the mole ratio of Si to Ti in the outer margin layer 23a is higher than the mole ratio of Si to Ti in the inner margin layer 23b. For example, the mole ratio of Si to Ti in the outer margin layer 23a is preferably no less than about 3.5 and no more than about 6.0. The mole ratio of Si to Ti in the inner margin layer is preferably no less than about 0.02 and no more than about 3.5. The mole ratio can be measured by WDX analysis or a TEM.

Since Si acts as a sintering additive, the outer margin layer 23a that is obtained by firing when the multilayer ceramic capacitor 10 is manufactured has a finer structure than that of the inner margin layer 23b. This enables the strength of the margin portions 23 to be increased. Accordingly, the margin portions 23 are unlikely to crack and chip, and water is prevented from entering the inside.

The margin portions 23 may preferably be formed, for example, in a manner in which a multilayer body chip that is to be the inner layer portion 21 and the outer layer portions 22 after firing is manufactured, and ceramic green sheets are subsequently attached to both of side surfaces of the multilayer body chip and fired. Ceramic slurry that is to be the ceramic green sheets may be applied to both of the side surfaces.

The first outer electrodes 1 are disposed on the first end surface 15a and the second end surface 15b of the multilayer body 11. The first outer electrode 1 that is disposed near the first end surface 15a is disposed on the entire or substantially the entire first end surface 15a and extends from the first end surface 15a along the first main surface 16a, the second main surface 16b, the first side surface 17a, and the second side surface 17b. The first outer electrode 1 that is disposed near the second end surface 15b is disposed on the entire or substantially the entire second end surface 15b and extends from the second end surface 15b along the first main surface 16a, the second main surface 16b, the first side surface 17a, and the second side surface 17b.

Figure 6A:
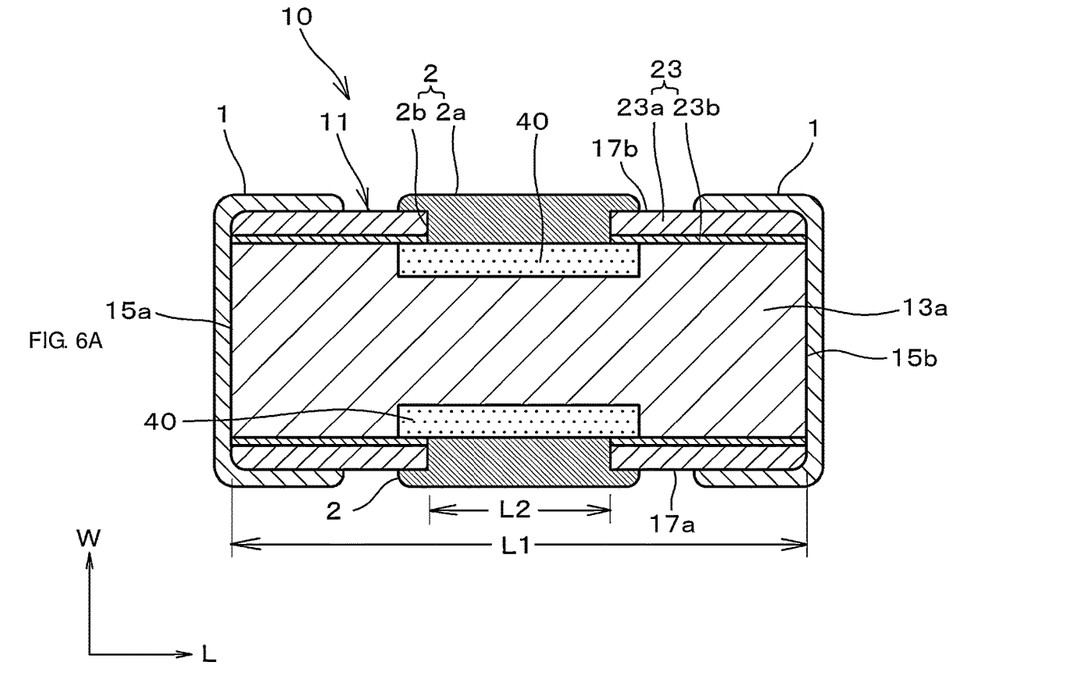
FIG. 6A is a sectional view of a multilayer ceramic capacitor according to a preferred embodiment of the present invention taken along a plane containing a first inner electrode.
Figure 6B:
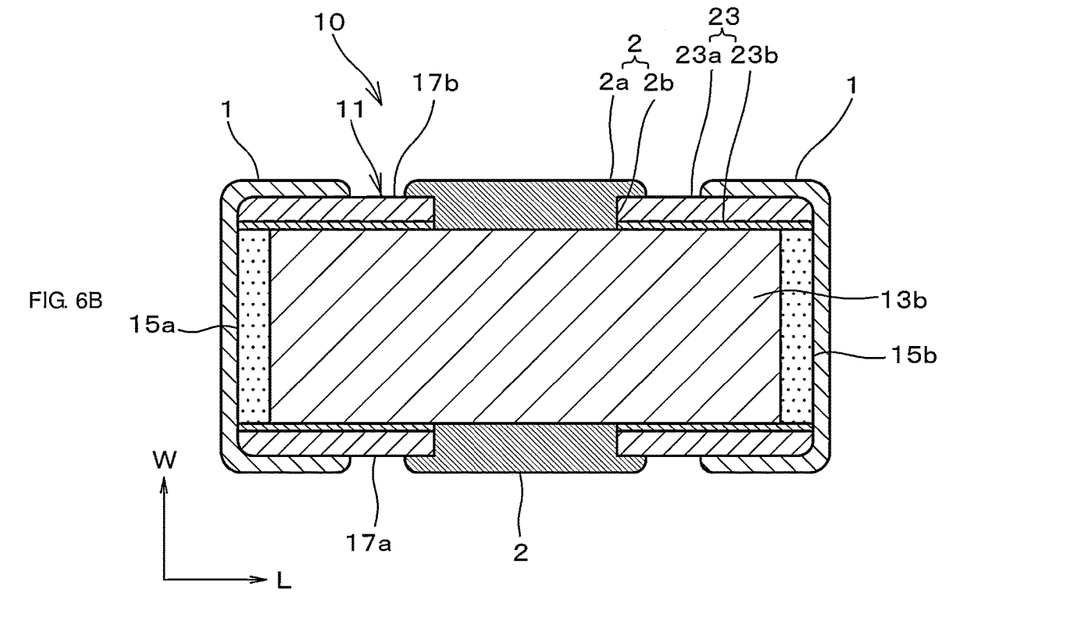
FIG. 6B is a sectional view thereof taken along a plane containing a second inner electrode.

FIG. 6A is a sectional view of the multilayer ceramic capacitor 10 taken along a plane containing one of the first inner electrodes 13a. FIG. 6B is a sectional view thereof taken along a plane containing one of the second inner electrodes 13b.

As illustrated in FIG. 6A, the first outer electrodes 1 are directly connected to the first inner electrodes 13a along the first end surface 15a and the second end surface 15b of the multilayer body 11 and are electrically connected to the first inner electrodes 13a. As illustrated in FIG. 6B, the first outer electrodes 1 are not electrically connected to the second inner electrodes 13b.

In the specification, the meaning of the outer electrodes being directly connected to the inner electrodes is that the outer electrodes and the inner electrodes are connected to each other with the outer electrodes and the inner electrodes being in contact with each other.

Each first outer electrode 1 preferably contains a metal such as Ni, Cu, Ag, Pd, an Ag—Pd alloy, or Au, for example. The first outer electrode 1 preferably contains the common material that is the same material as the dielectric ceramics that is contained in the dielectric layers 12. The common material enables the behavior of shrinkage of the first outer electrode 1 during firing to be close to the behavior of shrinkage of the multilayer body 11 and prevents the first outer electrode 1 from being separated from the multilayer body 11.

The second outer electrodes 2 are disposed on the first side surface 17a and the second side surface 17b of the multilayer body 11. The second outer electrode 2 that is disposed near the first side surface 17a is disposed on a central portion of the first side surface 17a in the length direction L and extends from the first side surface 17a along the first main surface 16a and the second main surface 16b. The second outer electrode 2 that is disposed near the second side surface 17b is disposed on a central portion of the second side surface 17b in the length direction L and extends from the second side surface 17b along the first main surface 16a and the second main surface 16b.

The positions of the second outer electrodes 2 that are disposed on the first side surface 17a and the second side surface 17b are not limited to the positions of the central portions in the length direction L.

As illustrated in FIGS. 6A and 6B, the second outer electrodes 2 that are disposed on the first side surface 17a and the second side surface 17b of the multilayer body 11 include respective surface portions 2a that are located on the surfaces of the multilayer body 11 and respective through sections 2b that extend through the margin portions 23. As illustrated in FIG. 6B, the through sections 2b are located between the first side surface 17a or the second side surface 17b of the multilayer body 11 and the end portions of the second inner electrodes 13b in the width direction W. The second outer electrodes 2 are directly connected to the second inner electrodes 13b at positions spaced away from the first side surface 17a and the second side surface 17b toward the inside of the multilayer body 11 by using the through sections 2b and are electrically connected to the second inner electrodes 13b. Each through section 2b preferably has a size of at least about 10 μm or more, for example. At least the through sections that are connected to the corresponding second inner electrodes 13b face each other in the stacking direction.

Each first inner electrode 13a includes the notches 40 on the central portion in the length direction L and along both of the edges in the width direction W, as described above. The notches 40 overlap connections between the second inner electrodes 13b and the second outer electrodes 2 in the stacking direction T. As illustrated in FIG. 6A, both ends of the notches 40 in the length direction L are located nearer than both of ends of the through sections 2b of the second outer electrodes 2 in the length direction L to the outside. With this structure, the second outer electrodes 2 are not electrically connected to the first inner electrodes 13a.

The shortest distance L1 between the first end surface 15a and the second end surface 15b in the length direction L and the dimension L2 of each through section 2b in the length direction L preferably satisfy the following expression (1).

$$L2/L1 \geq 0.42 \tag{1}$$

The above L1 and L2 more preferably satisfy the following expression (2).

$$L2/L1 \geq 0.52 \tag{2}$$

A resistance value can be decreased by increasing the dimension L2 of each through section 2b in the length direction L against the shortest distance L1 between the first end surface 15a and the second end surface 15b in the length direction L, and consequently, a large electric current is able to flow. The ESL (equivalent series inductance) of the multilayer ceramic capacitor 10 can be decreased as described later.

Figure 7:
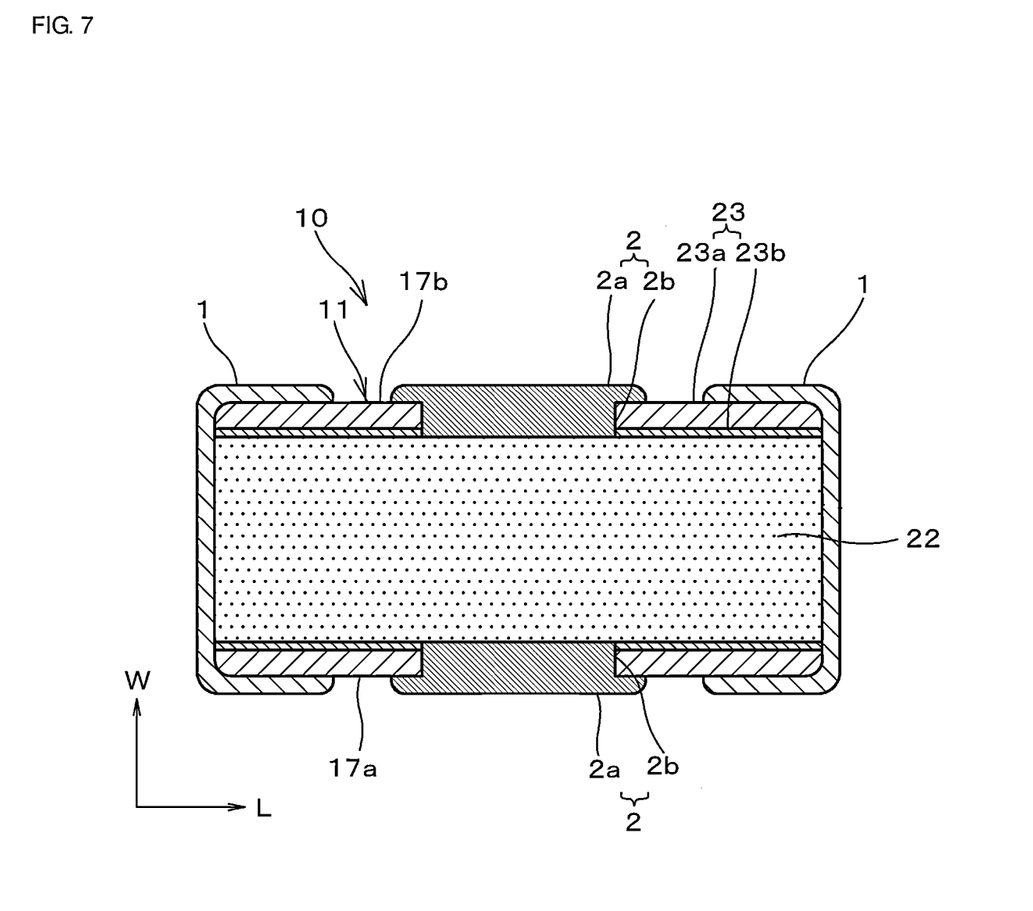
FIG. 7 is a sectional view of a multilayer ceramic capacitor according to a preferred embodiment of the present invention taken along a plane containing an outer layer portion.

FIG. 7 is a sectional view of the multilayer ceramic capacitor 10 taken along a plane containing one of the outer layer portions 22. As illustrated in FIG. 7, the second outer electrodes 2 include the through sections 2b that extend through the margin portions 23 not only at height positions in the stacking direction T at which the second inner electrodes 13b are disposed, but also at height positions at which the second inner electrodes 13b are not disposed but the outer layer portions 22 are disposed.

That is, the through sections 2b of the second outer electrodes 2 extend through the margin portions 23 from the first main surface 16a of the multilayer body 11 to the second main surface 16b when viewed in the stacking direction T.

Each second outer electrode 2 preferably contains a metal such as Ni, Cu, Ag, Pd, an Ag—Pd alloy, or Au, for example. The second outer electrode 2 preferably contains the common material that is the same ceramic material as the dielectric ceramics that is contained in the dielectric layers 12. The common material enables the shrinkage behavior of the second outer electrode 2 during firing to be close to the shrinkage behavior of the multilayer body 11 and prevents the second outer electrode 2 from being separated from the multilayer body 11.

The first outer electrodes 1 and the second outer electrodes 2 may preferably be formed, for example, by being simultaneously fired together with the first inner electrodes 13a and the second inner electrodes 13b, that is, by co-firing. In this case, the first outer electrodes 1 and the second outer electrodes 2 each have a structure that is formed by being simultaneously fired.

In the case of formation by co-firing, for example, the first inner electrodes 13a and the second inner electrodes 13b may preferably contain Ni, and the first outer electrodes 1 and the second outer electrodes 2 may also preferably contain Ni. The formation by co-firing enables the strength of joints between the first inner electrodes 13a and the first outer electrodes 1 and the strength of joints between the second inner electrodes 13b and the second outer electrodes 2 to be increased.

In the case where the first outer electrodes 1 and the second outer electrodes 2 are formed by co-firing, the amount of the common material that is contained in the first outer electrodes 1 and the second outer electrodes 2 is preferably larger than the amount of the common material that is contained in the first inner electrodes 13a and the second inner electrodes 13b in order to increase the strength of the joints between the first outer electrodes 1 and the multilayer body 11 and between the second outer electrodes 2 and the multilayer body 11. For example, the amount of the common material that is contained in the first outer electrodes 1 and the second outer electrodes 2 by wt % is preferably equal to or more than about 3 times the amount of the common material that is contained in the first inner electrodes 13a and the second inner electrodes 13b.

The type of elements that are contained in the first outer electrodes 1 and the second outer electrodes 2 can be checked by transmission electron microscope-energy-dispersive X-ray spectroscopy (TEM-EDX) elemental analysis.

In the case where the first outer electrodes 1 and the second outer electrodes 2 are Ni layers, the content of a ceramic material in each Ni layer is preferably no less than about 25 area % and no more than about 40 area %. The meaning of the content of the ceramic material in the Ni layer being about 25 area % or more is that the ceramic material is contained in a predetermined amount or more in the Ni layer. The outer electrodes 1 and 2 that include the corresponding Ni layer that contain the ceramic material in a predetermined amount or more can be formed by simultaneously firing outer electrode paste when the multilayer body is fired. The content of the ceramic material in the Ni layer is more preferably about 40 area % or less.

The content of the ceramic material in each Ni layer is measured by the following method with the wave-length-dispersive X-ray spectroscopy (WDX). A section of a central portion of the multilayer ceramic capacitor 10 in the width direction W is first exposed. A central portion of the Ni layer in the thickness direction in a central portion of the multilayer body 11 in the stacking direction T is enlarged to 10000 times. The field of view of an enlarged region has a range of about 6 μm× about 8 μm. The enlarged region is mapped by WDX. An area ratio is measured from an image that is obtained by mapping.

Each first outer electrode 1 preferably includes a Ni layer 1d, a first plating layer 1e, a second plating layer 1f, and a third plating layer 1g that are arranged in this order from a position near the first end surface 15a or the second end surface 15b of the multilayer body 11. Similarly, each second outer electrode 2 preferably includes a Ni layer 2d, a first plating layer 2e, a second plating layer 2f, and a third plating layer 2g in this order from a position near the first side surface 17a or the second side surface 17b of the multilayer body 11. The first plating layers 1e and 2e are preferably formed by Cu plating. The second plating layers 1f and 2f are preferably formed by Ni plating. The third plating layers 1g and 2g are preferably formed by Sn plating. Only the second plating layers 1f and 2f and the third plating layers 1g and 2g may be provided. The first outer electrode 1 may preferably include, for example, a conductive resin layer that contains conductive particles and resin between the Ni layer 1d and the first plating layer 1e. Similarly, the second outer electrode 2 may preferably include, for example, a conductive resin layer that contains conductive particles and resin between the Ni layer 2d and the first plating layer 2e. Examples of the conductive particles include metal particles such as Cu particles, Ag particles, and Ni particles.

In the case where the second outer electrodes 2 are formed by co-firing, the boundaries between the second outer electrodes 2 and the second inner electrodes 13b can be checked by checking the amounts of the common materials that are contained therein because the amount of the common material that is contained in the second outer electrodes 2 differs from the amount of the common material that is contained in the second inner electrodes 13b. In addition, whether the second inner electrodes 13b protrude outward in the width direction W so as to be connected to the second outer electrodes 2, or whether the second outer electrodes 2 extend inward in the width direction W so as to be connected to the second inner electrodes 13b can be determined by checking the boundaries between the second outer electrodes 2 and the second inner electrodes 13b.

The first outer electrodes 1 and the second outer electrodes 2 can also be formed by firing conductive paste that is applied to the multilayer body 11, that is, by post-firing. In the case where the first outer electrodes 1 and the second outer electrodes 2 are formed by post-firing, the first inner electrodes 13a and the second inner electrodes 13b preferably contain glass in a larger amount than those in the first outer electrodes 1 and the second outer electrodes 2. Accordingly, the boundaries between the second outer electrodes 2 and the second inner electrodes 13b can be checked by checking the amounts of glass contained in the second outer electrodes 2 and the second inner electrodes 13b. In addition, whether the second inner electrodes 13b protrude outward in the width direction W so as to be connected to the second outer electrodes 2, or whether the second outer electrodes 2 extend inward in the width direction W so as to be connected to the second inner electrodes 13b can be determined by checking the boundaries between the second outer electrodes 2 and the second inner electrodes 13b.

The outer electrode paste for forming the first outer electrodes 1 and the second outer electrodes 2 is preferably applied using a roller in order to reduce or prevent air from entering the inside.

The dimension of each margin portion 23 of the multilayer ceramic capacitor 10 according to the present preferred embodiment in the width direction W is smaller than that in an existing multilayer ceramic capacitor and is preferably, for example, no less than about 5 μm and no more than about 30 μm. This enables the ESL of the multilayer ceramic capacitor 10 to be decreased. Measurement results of the ESL of the multilayer ceramic capacitor 10 according to the present preferred embodiment and the existing multilayer ceramic capacitor are illustrated in Table 1. Measuring frequency bands are 100 MHz and 1 GHZ.

TABLE 1

| | ESL (pH) of Product according to Present Invention | ESL (pH) of Existing Product |
|---|---|---|
| 100 MHZ | 106 | 106 |
| 1 GHZ | 96 | 97 |

The size of the multilayer ceramic capacitor 10 that is used in measurement is about 1.00 mm× about 0.50 mm× about 0.50 mm in the case of being expressed as the dimension in the length direction L× the dimension in the width direction W× the dimension in the stacking direction T. The size of the existing multilayer ceramic capacitor is about 1.00 mm× about 0.50 mm× about 0.50 mm. The dimension, in the width direction W, of each margin portion 23 of the multilayer ceramic capacitor 10 that is used in measurement is about 20 μm. The dimension of each margin portion 23 of the existing multilayer ceramic capacitor in the width direction W is about 50 μm. The dimension L2 of each through section 2b of the second outer electrodes 2 in the length direction L is about 100 μm in both of the multilayer ceramic capacitors.

As illustrated in Table 1, the ESL of the multilayer ceramic capacitor 10 according to the present preferred embodiment is equal or substantially equal to that of the existing multilayer ceramic capacitor although the dimension of the multilayer ceramic capacitor 10 in the width direction W is about half of that of the existing multilayer ceramic capacitor. In a frequency band of 1 GHz, the ESL is smaller than that of the existing multilayer ceramic capacitor.

Table 2 illustrates measurement results of the ESL of four types of the multilayer ceramic capacitors 10 that have different dimensions L2 of each through section 2b of the second outer electrodes 2 in the length direction L and the existing multilayer ceramic capacitor described above. The size of each of the four types of the multilayer ceramic capacitors 10 is about 1.00 mm× about 0.50 mm× about 0.50 mm. The above dimensions L2 are about 100 μm, about 200 μm, about 420 μm, and about 520 μm. The shortest distance L1 between the first end surface 15a and the second end surface 15b in the length direction L is about 1 mm. Accordingly, the values of L2/L1 of the four types of the multilayer ceramic capacitors 10 are about 0.1, about 0.2, about 0.42, and 0.52. The measuring frequency bands are 100 MHz and 1 GHz.

TABLE 2

| | ESL (pH) of Product according to Present Invention (L2 = 100 μm) | ESL (pH) of Product according to Present Invention (L2 = 200 μm) | ESL (pH) of Product according to Present Invention (L2 = 420 μm) | ESL (pH) of Product according to Present Invention (L2 = 520 μm) | ESL (pH) of Existing Product |
|---|---|---|---|---|---|
| 100 MHZ | 106 | 98 | 91 | 88 | 106 |
| 1 GHZ | 96 | 89 | 84 | 81 | 97 |

As illustrated in Table 2, the longer the dimension L2 of each through section 2b of the second outer electrodes 2 in length direction L, the smaller the ESL. In particular, when the above value of L2/L1 is about 0.42 or more, the ESL can be decreased by about 14% or more in a frequency band of 100 MHz and by about 13% or more in a frequency band of 1 GHz unlike the existing multilayer ceramic capacitor. When the above value of L2/L1 is about 0.52 or more, the ESL can be decreased by about 16% or more in a frequency band of 100 MHz and in a frequency band of 1 GHZ unlike the existing multilayer ceramic capacitor.

In the multilayer ceramic capacitor 10 according to the present preferred embodiment, the second outer electrodes 2 that are disposed on the first side surface 17a and the second side surface 17b of the multilayer body 11 are directly connected to the second inner electrodes 13b at positions spaced away from the first side surface 17a and the second side surface 17b toward the inside of the multilayer body 11 as described above. That is, it is not necessary for the second inner electrodes 13b to include extended portions that protrude in the width direction W for connection to the second outer electrodes 2. Accordingly, effective regions in which the first inner electrodes 13a and the second inner electrodes 13b overlap in the stacking direction T can be enlarged, and the electrostatic capacitance per volume can be increased.

In particular, the second outer electrodes 2 of the multilayer ceramic capacitor 10 according to the present preferred embodiment include the through sections 2b that extend through the margin portions 23 and are directly connected to the second inner electrodes 13b by using the through sections 2b. With this structure, the second inner electrodes 13b include no extended portions that protrude in the width direction W for connection to the second outer electrodes 2, and the second inner electrodes 13b and the second outer electrodes 2 can be connected to each other.

In a multilayer ceramic capacitor that corresponds to an electronic component according to a preferred embodiment of the present invention, first outer electrodes are disposed on a first end surface and a second end surface of a multilayer body, at least one second outer electrode is disposed on at least one of the first side surface or the second side surface, the at least one second outer electrode is directly connected to inner electrodes at positions away from the at least one of the first side surface or the second side surface toward the inside of the multilayer body. The multilayer ceramic capacitor 10 according to the present preferred embodiment described above is an example of the multilayer ceramic capacitor that has such a structure. Another example of the multilayer ceramic capacitor that has the structure of an electronic component according to a preferred embodiment of the present invention other than the above multilayer ceramic capacitor 10 will be described below.

Figure 8A:
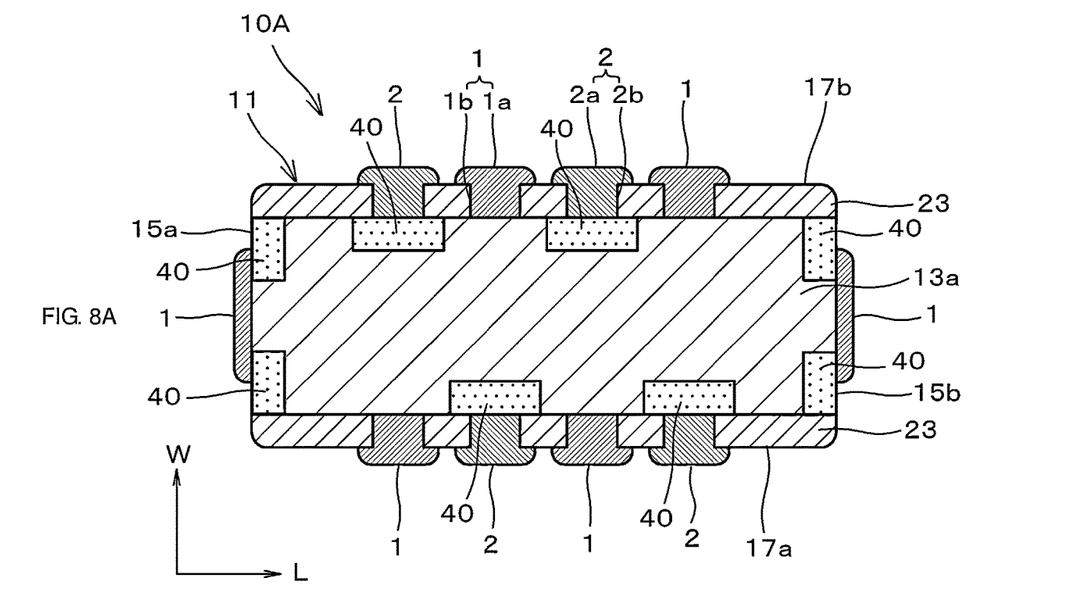
FIG. 8A is a sectional view of a multilayer ceramic capacitor according to a preferred embodiment of the present invention in which first outer electrodes are disposed on a first side surface, a second side surface, a first end surface, and a second end surface of the multilayer body, and second outer electrodes are disposed on the first side surface and the second side surface, taken along a plane containing the first inner electrode.
Figure 8B:
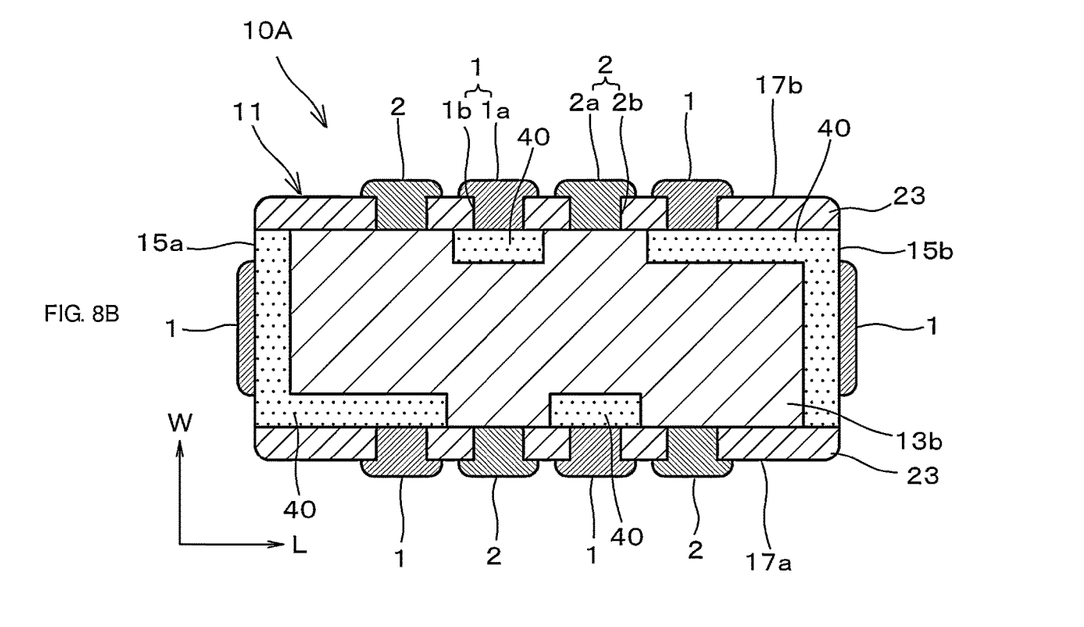
FIG. 8B is a sectional view thereof taken along a plane containing the second inner electrode.

FIG. 8A is a sectional view of a multilayer ceramic capacitor 10A in which the first outer electrodes 1 are disposed on the first side surface 17a, the second side surface 17b, the first end surface 15a, and the second end surface 15b of the multilayer body 11, and the second outer electrodes 2 are disposed on the first side surface 17a and the second side surface 17b, taken along a plane containing one of the first inner electrodes 13a. FIG. 8B is a sectional view thereof taken along a plane containing one of the second inner electrodes 13b. In FIGS. 8A and 8B, each margin portion 23 is illustrated as a single layer but may include margin layers.

Two of the first outer electrodes 1 and two of the second outer electrodes 2 are alternately disposed on the first side surface 17a and the second side surface 17b of the multilayer body 11. One of the first outer electrodes 1 is disposed on the first end surface 15a, and the other first outer electrode is disposed on the second end surface 15b.

As illustrated in FIG. 8A, the first outer electrodes 1 that are disposed on the first side surface 17a and the second side surface 17b of the multilayer body 11 include respective surface portions 1a that are located on the surfaces of the multilayer body 11 and respective through sections 1b that extend through the margin portions 23. As illustrated in FIGS. 8A and 8B, the second outer electrodes 2 that are disposed on the first side surface 17a and the second side surface 17b of the multilayer body 11 include the respective surface portions 2a that are located on the surfaces of the multilayer body 11 and respective through sections 2b that extend through the margin portions 23.

As illustrated in FIG. 8A, each first inner electrode 13a includes the notches 40 that overlap connections between the second inner electrodes 13b and the second outer electrodes 2 in the stacking direction T. As illustrated in FIG. 8B, each second inner electrode 13b includes the notches 40 that overlap connections between the first inner electrodes 13a and the first outer electrodes 1 in the stacking direction T.

With the above structure, the first outer electrodes 1 are connected to the first inner electrodes 13a as illustrated in FIG. 8A but are not connected to the second inner electrodes 13b as illustrated in FIG. 8B. The second outer electrodes 2 are connected to the second inner electrodes 13b as illustrated in FIG. 8B but are not connected to the first inner electrodes 13a as illustrated in FIG. 8A.

In the multilayer ceramic capacitor 10A illustrated in FIGS. 8A and 8B, the first inner electrodes 13a include no extended portions that protrude in the width direction W for connection to the first outer electrodes 1, and the second inner electrodes 13b include no extended portions that protrude in the width direction W for connection to the second outer electrodes 2.

The present invention is not limited to the above-described preferred embodiments. Various applications and modifications can be made within the scope of the present invention.

For example, in the multilayer ceramic capacitor 10, each through section 2b of the second outer electrodes 2 may have a dimension near the inner layer portion 21 in the length direction L that is smaller than those near the first side surface 17a and the second side surface 17b. Similarly, in the multilayer ceramic capacitor 10A, each through section of the outer electrodes may have a dimension near the inner layer portion 21 in the length direction L that is smaller than those near the side surfaces.

In the multilayer ceramic capacitor 10, each margin portion 23 includes the margin layers 23a and 23b that are stacked in the width direction W. However, the margin portion 23 may be defined by a single layer.

An electronic component according to preferred embodiments of the present invention includes an outer electrode that includes first outer electrodes that are disposed on a first end surface and a second end surface, and at least one second outer electrode that is disposed on at least one of the first side surface or the second side surface, inner electrodes include no extended portions that protrude in the width direction for connection to the at least one second outer electrode, and the at least one second outer electrode is directly connected to the inner electrodes, as described above. Accordingly, any electronic component that has the above structure other than the electronic components according to the above-described preferred embodiments and modifications thereof corresponds to an electronic component of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An electronic component comprising:
a multilayer body including inner electrodes and dielectric layers that are alternately stacked; and
an outer electrode that is electrically connected to the inner electrodes; wherein
the multilayer body includes a first main surface and a second main surface that are opposite to each other in a stacking direction, a first side surface and a second side surface that are opposite to each other in a width direction perpendicular or substantially perpendicular to the stacking direction, and a first end surface and a second end surface that are opposite to each other in a length direction perpendicular or substantially perpendicular to the stacking direction and the width direction;
the outer electrode includes first outer electrodes that are disposed on the first end surface and the second end surface, and at least one second outer electrode that is disposed on at least one of the first side surface or the second side surface;
the at least one second outer electrode includes a second outer electrode that is disposed on one of the first and second side surfaces, and is directly connected to a corresponding one of the inner electrodes at a position spaced away from the one of the first and second side surfaces on which the second outer electrode is disposed toward an inside of the multilayer body;
each of the inner electrodes that is directly connected to the second outer electrode is directly connected to the second outer electrode at a distance from the one of the first and second sides on which the second external electrode is disposed toward the inside of the multilayer body;
the inner electrodes include a first inner electrode that is electrically connected to a corresponding one of the first outer electrodes, and a second inner electrode that is electrically connected to the at least one second outer electrode;
the second inner electrode is not in contact with the first end surface and the second end surface of the multilayer body; and
the first inner electrode includes a notch that overlaps a connection between the second inner electrode and the at least one second outer electrode in the stacking direction.

2. The electronic component according to claim 1, wherein
the multilayer body includes a margin portion in which the inner electrodes are not provided when a section of the multilayer body having the length direction and the width direction is viewed in the stacking direction; and the at least one second outer electrode includes a through section that extends through the margin portion and is directly connected to the inner electrodes by using the through section.

3. The electronic component according to claim 2, wherein a dimension of the margin portion in the width direction is no less than about 5 μm and no more than about 30 μm.

4. The electronic component according to claim 3, wherein a shortest distance L1 between the first end surface and the second end surface in the length direction and a dimension L2 of the through section in the length direction satisfy a relationship of L2/L1≥0.42.

5. The electronic component according to claim 4, wherein the shortest distance L1 and the dimension L2 satisfy a relationship of L2/L1≥0.52.

6. The electronic component according to claim 2, wherein the margin portion includes a plurality of margin layers that are stacked in the width direction.

7. The electronic component according to claim 1, wherein
the second inner electrode contains Si and Ti; and
a mole ratio of Si to Ti contained in an end portion of the second inner electrode in the width direction is larger than that in a central portion of the second inner electrode in the width direction.

8. The electronic component according to claim 1, wherein the outer electrode has a structure that is provided by being simultaneously fired together with the inner electrodes.

9. The electronic component according to claim 2, wherein an average particle diameter of a dielectric particle that is contained in the dielectric layers that are interposed between the inner electrodes is larger than an average particle diameter of a dielectric particle that is contained in the margin portion.

10. The electronic component according to claim 1, wherein a dimension, in the width direction, of one of the inner electrodes that is located at a central portion in the stacking direction is larger than a dimension, in the width direction, of another inner electrode that is located at an outer portion in the stacking direction.

11. The electronic component according to claim 1, wherein
the first inner electrode has a size smaller than that of each of the dielectric layers.

12. The electronic component according to claim 1, wherein
the first inner electrode contains Si and Ti; and
a mole ratio of Si to Ti contained in an end portion of the first inner electrode in the width direction is larger than that in a central portion of the first inner electrode in the width direction.

13. The electronic component according to claim 1, wherein end portions of the inner electrodes are aligned in the stacking direction when a section of the multilayer body having the width direction and the stacking direction is viewed in the length direction.

14. The electronic component according to claim 1, wherein
the multilayer body includes an inner layer portion and outer layer portions disposed on both sides of the inner layer portion in the stacking direction; and
none of the inner electrodes are disposed in the outer layer portions.

15. The electronic component according to claim 14, wherein each of the outer layer portions include a dielectric body made of a same material as that of the dielectric layers.

16. The electronic component according to claim 2, wherein the margin portion includes a dielectric body made of a dielectric ceramic material that contains $BaTiO_3$ as a main component and has a perovskite structure.

17. The electronic component according to claim 16, wherein the main component includes an additive of Si.

18. The electronic component according to claim 7, wherein
the plurality of margin layers include an inner margin layer and an outer margin layer; and
the outer margin layer contains Si in an amount larger than that in the inner margin layer.

19. The electronic component according to claim 18, wherein a mole ratio of Si to Ti in the outer margin layer is higher than a mole ratio of Si to Ti in the inner margin layer.

* * * * *